(12) United States Patent
Vento (10) Patent No.: US 8,813,685 B2
(45) Date of Patent: Aug. 26, 2014

(54) ENDLESS STREAM FISH TANK

(71) Applicant: Keepalive, Inc., Tarpon Springs, FL (US)

(72) Inventor: Thomas Joseph Vento, Tarpon Springs, FL (US)

(73) Assignee: Keepalive, Inc., Tarpon Springs, FL (US)

( * ) Notice: Subject to any disclaimer, the term of this patent is extended or adjusted under 35 U.S.C. 154(b) by 0 days.

(21) Appl. No.: 13/872,408

(22) Filed: Apr. 29, 2013

(65) Prior Publication Data

US 2013/0263792 A1    Oct. 10, 2013

Related U.S. Application Data

(60) Division of application No. 12/769,877, filed on Apr. 29, 2010, now abandoned, which is a continuation-in-part of application No. 11/937,961, filed on Nov. 9, 2007, now abandoned.

(51) Int. Cl.
*A01K 63/00*    (2006.01)

(52) U.S. Cl.
USPC .......................................... 119/226; 119/251

(58) Field of Classification Search
USPC ................... 119/200, 215, 226, 248, 251, 252
See application file for complete search history.

(56) References Cited

U.S. PATENT DOCUMENTS

| 3,216,395 | A | * | 11/1965 | Girard | 119/252 |
| 4,162,681 | A | * | 7/1979 | Patterson | 119/203 |
| 4,368,691 | A | * | 1/1983 | Brune | 119/207 |
| 4,593,647 | A | * | 6/1986 | Sorgeloos et al. | 119/205 |
| 4,811,692 | A | * | 3/1989 | Malmbak-Kjeldsen | 119/202 |
| 4,815,411 | A | * | 3/1989 | Burgess | 114/255 |
| 5,253,610 | A | * | 10/1993 | Sharber | 119/215 |
| 5,305,711 | A | * | 4/1994 | Sharber | 119/215 |
| 6,352,051 | B1 | * | 3/2002 | Wang | 119/252 |
| 6,932,025 | B2 | * | 8/2005 | Massingill et al. | 119/216 |
| 7,690,330 | B2 | * | 4/2010 | Miller | 119/228 |

FOREIGN PATENT DOCUMENTS

| JP | 09313067 A | * | 12/1997 | A01K 63/00 |
| JP | 2002119169 A | * | 4/2002 | A01K 63/00 |
| WO | WO 9300800 A1 | * | 1/1993 | A01K 63/00 |
| WO | WO 9323993 A1 | * | 12/1993 | A01K 61/00 |

* cited by examiner

*Primary Examiner* — Kimberly Berona
*Assistant Examiner* — Danielle Clerkley
(74) *Attorney, Agent, or Firm* — Patent Central LLC; Stephan A. Pendorf (57) ABSTRACT

A method for keeping fish in a live and healthy condition, wherein the fish are placed in an endless flow fish tank, which occupies relatively little space, yet allows instinctively swimming fish to swim comfortably. Aerated water is pumped in one direction through a swim chamber, and water returns through a space between inner and outer container, through return flow piping, or through a second swim chamber which also serves as a return flow chamber.

13 Claims, 14 Drawing Sheets

ENDLESS STREAM FISH TANK

This is a divisional application of U.S. patent application Ser. No. 12/769,877, filed Apr. 29, 2010, pending, which is a continuation-in-part of U.S. patent application Ser. No. 11/937,961, filed Nov. 9, 2007, abandoned, the entirety of which is herein incorporated by reference.

FIELD OF THE INVENTION

The present invention relates in general to a fish tank, either portable or installed in a boat as a livewell, for keeping fish or bait alive in a healthy condition and, more specifically, to a portable fish tank or a livewell that provides an artificial current in the water for species of fish that require continuous movement to keep them in a healthier and less stressed environment.

BACKGROUND OF THE INVENTION

In order to maintain species of fish that require continuous movement through the water, an artificial current must be provided in portable tanks or livewells to ensure their survival. Fast swimming fish will school in the current along the perimeter of the tank. The size of the fish that can be maintained is limited by the diameter of the tank. Larger fish would need an extremely large tank to ensure that they can swim without their bodies being continuously curved and causing them damage. These types of tanks are not only stressful for the fish, but cumbersome, and take up valuable deck space for passengers, increase the weight of the boat, and may also cause safety hazards.

Figure 1:
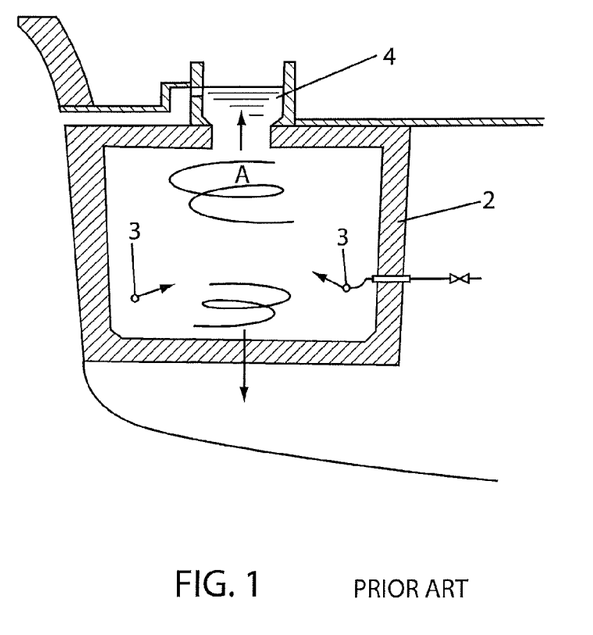
FIG. 1 shows a prior art live-fish tank disclosed by JP 59-167396 A.

Japanese Patent Application JP 59-167396 A (see FIG. 1) discloses a live-fish tank 2 in a fishing boat in which a water jet pipe 3 is provided in a position slightly higher than the bottom face of the live-fish tank, the tank having a hatch 4 at the center of its ceiling. A number of jet holes, which jet out water deflected from the center of the tank 2, are provided on the jet pipe. By jetting out sea water, a whirling stream A is generated in the upper part of the tank 2 for live fish to swim in. The fish tank disclosed by JP 59-167396 A must be large in order to maintain live fish, which is disadvantageous particularly onboard a boat where space and weight are limited.

SUMMARY OF THE INVENTION

The object of the invention is therefore to overcome the above-mentioned drawbacks of the prior art live-fish tanks and to provide a fish tank, either portable or installed in a boat as a livewell, that (a) will provide an environment to allow small or large fish to swim in a more natural state, and (b) is smaller and lighter than the conventional bait and fish tanks, and thus save deck space and reduce the weight added to the boat.

The above object is achieved by producing continuous water movement in one direction in a long and narrow swim space defined within a tank. In one embodiment the tank includes an inner container for fish to swim in and an outer container for facilitating water circulation. The water enters the inner container at one end through an entry hole and exits the inner container into the outer container at the other end of the inner container through an exit hole, and then returns to the entry hole back into the inner container. This creates an endless stream in the inner container. During the circulation of the water, it can also provide aeration required for fish within the inner container. This tank simulates a more natural movement of water for fish survival. The fish will swim upstream and in one direction. Water speeds may be adjusted according to the swimming speeds of the species of fish contained in the inner container by a pump installed in the outer container to provide a self contained unit. The pump is preferably designed to also function as an aeration unit, introducing atmospheric air, or oxygen from an oxygen bottle, directly into the water as it is being circulated.

The endless stream fish tank or livewell according to the invention has the advantage that it requires less space than the conventional large volume, round, oval or square tanks or livewells. It is long and narrow and can be placed inside or alongside the gunwales of a boat allowing more passenger space.

In one embodiment of the invention, an inner container inside the fish tank is designed to ensure a continuous stream of water with minimal eddies of water. The bottom of the inner container and/or the outer container of the tank can have a semi-circular (half pipe) shape to further reduce the size and weight of the tank by limiting the area of the container to the area most likely to be occupied by large fish, reducing the amount of water needed. The side walls of the outer container can be formed in corrugated shape to increase tank stability and reduce weight.

The fish tank or livewell according to the concept of the present invention can also be designed as a double tank configuration with each tank having therein a similar structure to the inner container of the single tank configuration as described above. The pump(s) may be installed between the two single tanks. Aeration can occur by metering gasses between two pumps, the two pumps joined to each other via a closed conduit. Air or pure oxygen can be introduced by either venturi or pressure. The downstream pump will allow continuous pressure to the upstream pump. This will allow maximum gasses to mix with the upstream pump without any deterioration of pump pressure in the line. This is required for fish that require continuous fast movement through the water.

If a slower moving fish needs to be maintained within the tank, the downstream pump can be bypassed. Metering of gases will occur between the pumps, or downstream of the upstream pump. Metering of gases downstream of the upstream pump will allow the speed of the upstream pump to be variable while maintaining water aeration. Water speed can be slowed almost to the point where the pump will start to cavitate in order to accommodate slower swimming species.

Both the single tank and double tank designs of the invention can be utilized as a portable fish tank or in permanent boat installations. The livewell can be a simple design, and plumbing can be hidden under the boat decking.

The single tank configuration allows all water flows required to be within the tank, and thus reduces plumbing requirements and hazards.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION OF THE INVENTION

Figure 2:
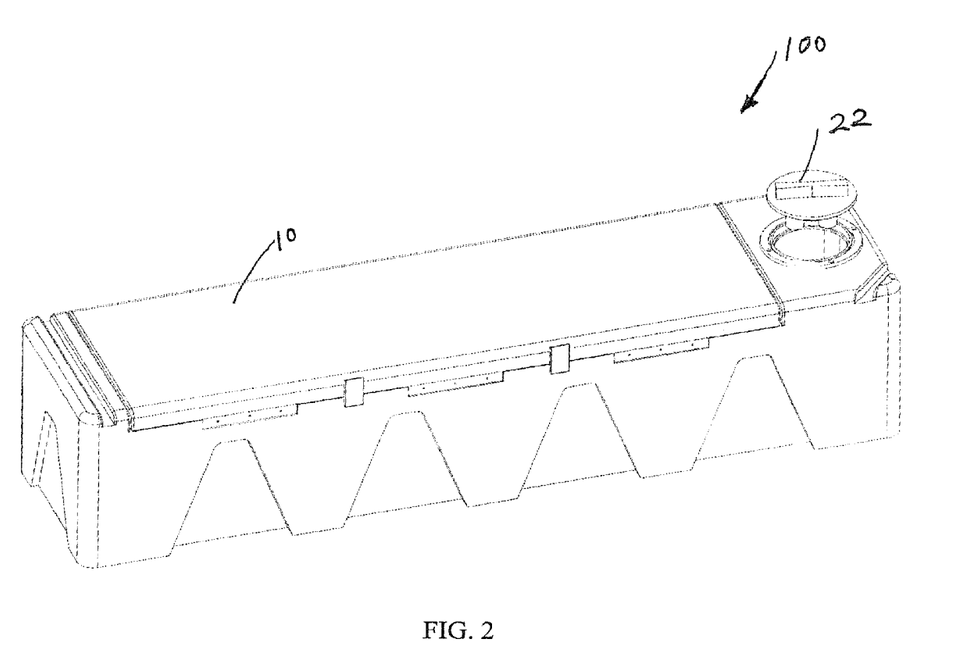
FIG. 2 is a perspective view of an embodiment of a single tank configuration, in the closed tank condition with removed pump lid, according to the present invention.

FIGS. 2-5 show an embodiment of a single tank configuration of the present invention. FIG. 2 is a perspective view of the single tank configuration. As can be seen in FIG. 2, the single tank 100 has an elongated narrow and square shape and has a tank lid 10 which can be opened up when putting fish in the tank or getting fish out of the tank. The tank lid 10 is closed during normal operating conditions. The tank lid 10 can be connected to one side of the outer container 40 by hinges or any other connecting mechanism. A pump lid 22 for a pump 20 (see FIG. 4) installed inside the tank is shown at one end of the tank. The pump lid 22 can be lifted when adding water into the tank or servicing the pump 20.

Figure 3:
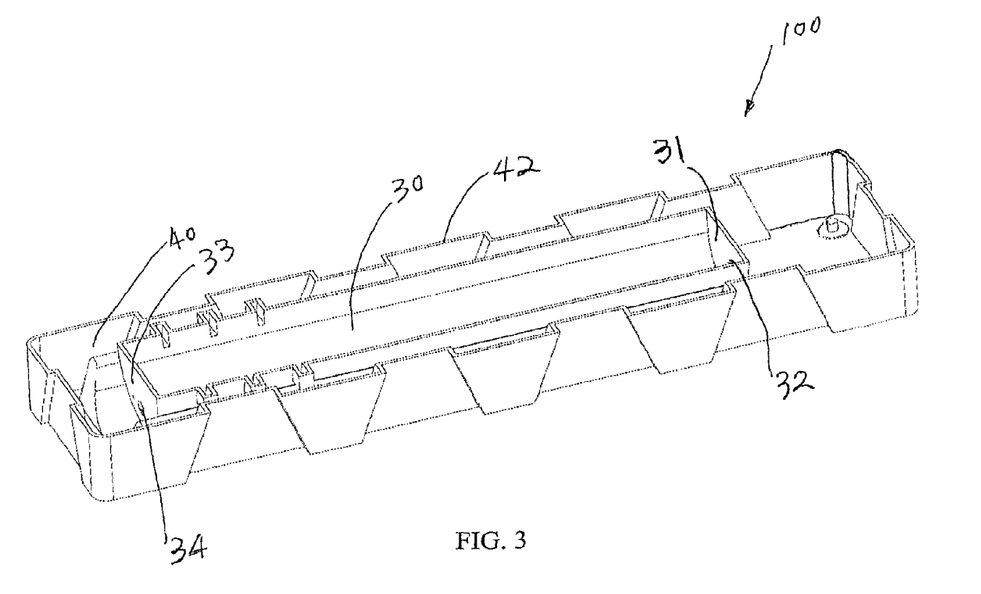
FIG. 3 is a perspective of a horizontal sectional view of the single tank configuration as shown in FIG. 2.

FIG. 3 is a horizontal cross-sectional view of the single tank configuration as shown in FIG. 2. As can be seen in FIG. 3, the tank 100 includes an inner container 30 and an outer container 40, which have similar shapes. The inner container functions as a fish chamber. The space between the inner and outer containers 30, 40 functions as a return chamber and should be limited to a minimum extent, just enough for water circulation. This can reduce the amount of water needed for the tank and thus reduce the overall operating weight of the fish tank. A pump 20 (not shown in FIG. 3, but shown in FIG. 4) is installed inside the outer tank 40 at one end thereof but outside of the inner tank 30. The pump 20 can be used to adjust the speed of the water stream in the tank and also provide aeration. The pump 20 may also be connected to an exterior gas or oxygen tank. The outer wall 42 of the outer container 40 can be formed with corrugated shapes, such as "M" shapes, in order to increase the stability and reduce the weight of the tank.

Figure 4:
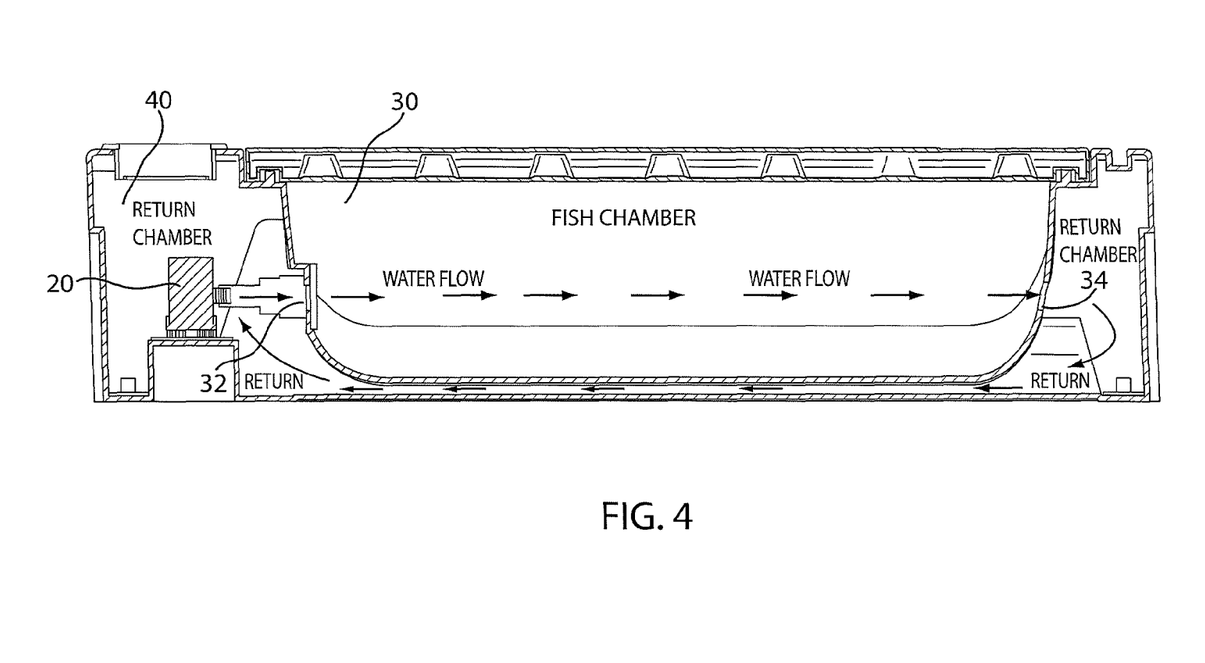
FIG. 4 is a diagram showing the water flow direction in the single tank configuration as shown in FIGS. 2-3.
Figure 5:
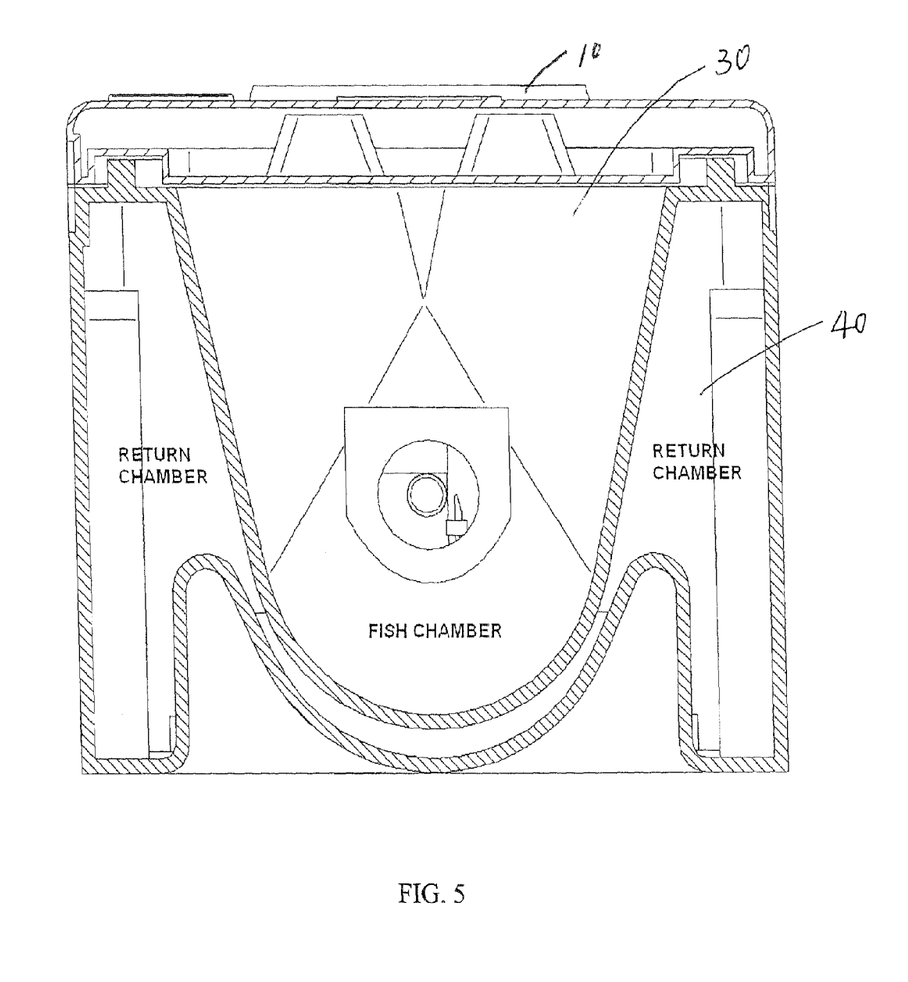
FIG. 5 is a side cross-sectional view of the single tank configuration as shown in FIG. 2.

The inner container 30 has a first end 31 and a second end 33. An entry hole 32 is formed in the first end 31 and an exit hole 34 is formed in the second end 33. The water enters the inner container 30 at the first end 31 through the entry hole 32 and exits the inner container 30 into the outer container 40 at the second end 33 of the inner container 30 through the exit hole 34. After passing through the space between the inner and outer containers 30, 40, the water then returns to the entry hole 32 and back into the inner container 30. This creates an endless stream in a straight direction in the inner container 30 for fish to swim against. The water circulation direction is shown in the diagram of FIG. 4. This simulates a more natural movement of water for fish survival. The fish will swim upstream and in one straight direction. Water speeds may be adjusted according to the swimming speeds of the species of fish contained in the inner container by the pump 20 installed in the outer container 40.

The inner container 30 of the fish tank 100 is designed to ensure a continuous stream of water with minimal eddies of water. The bottom of the inner container and/or the outer container of the tank can have a semi-circular shape to further reduce the size and weight of the tank by reducing the amount of water needed (see FIG. 5). The bottom of the outer container can be formed with semi-circular shape especially when the fish tank is to be installed as a livewell in a boat.

Figure 6:
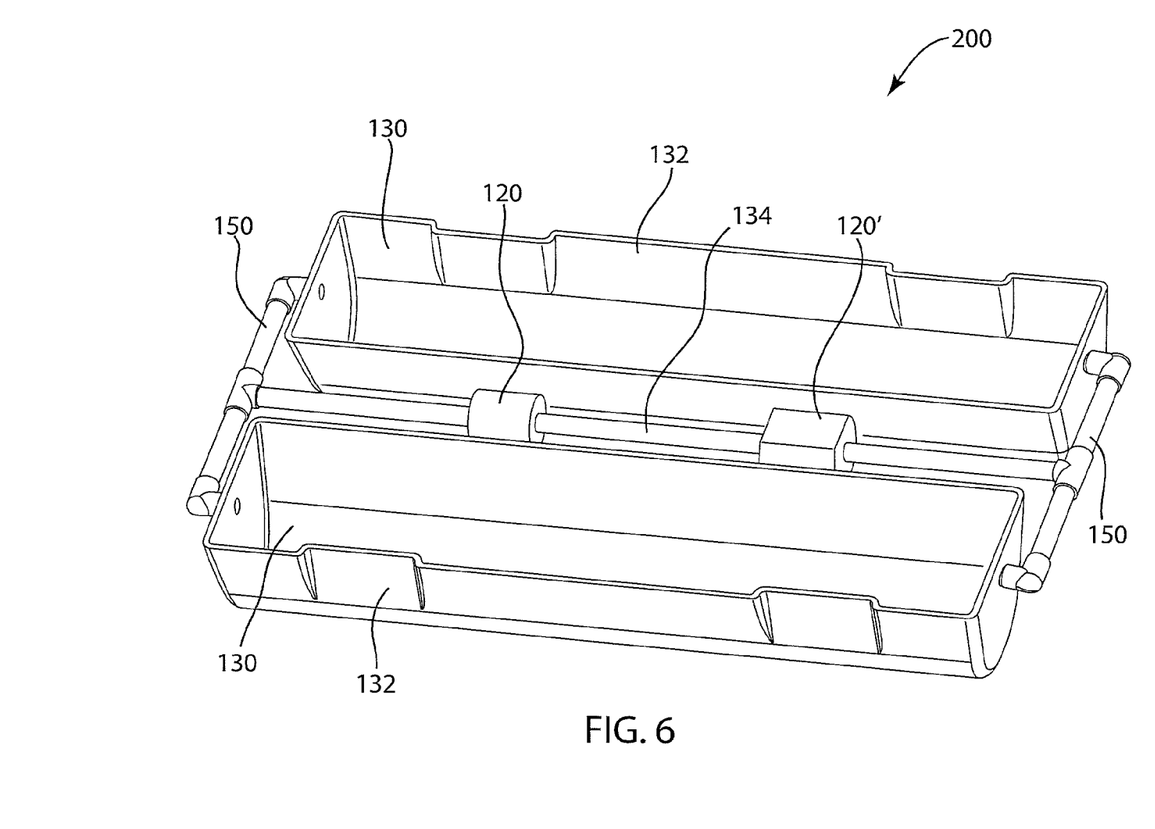
FIG. 6 diagrammatically shows an embodiment of a double tank configuration according to the present invention.

FIG. 6 shows a double tank configuration 200 according to the present invention, differing from the single tank embodiment in that, instead of using the space between an inside container and outside tank wall for recirculation, recirculation piping is used, thus, each fish tank may be single wall as shown in FIG. 6, or for structural integrity, an outside container or unifying structure may be added. Each tank 130 has a similar structure as the inner container 30 of the single tank configuration as described above except that the two single tanks 130 can have a side wall 132 formed with corrugated shapes like the outer container 40 of the single tank configuration 100. The two tanks 130 are connected by connecting pipes 150. The pump(s) may be installed between the two single tanks 130 and connected to the connecting pipes 150 to facilitate water circulation in both tanks. FIG. 6 shows two pumps, an upstream pump 120 and a downstream pump 120'. In one embodiment, aeration can occur by metering gasses between the two pumps. Air or pure oxygen can be introduced by either venturi or pressure. The downstream pump 120' will allow continuous pressure to the upstream pump 120. This will allow maximum gasses to mix with the upstream pump 120 without any deterioration of pump pressure in the line. This is required for fish that require continuous fast movement through the water.

If slower moving fish need to be maintained within the tank, the downstream pump 120' can be bypassed. Metering of gases will occur between the pumps, or downstream of the upstream pump. Metering of gases downstream of the upstream pump will allow the speed of the upstream pump to be variable while maintaining water aeration. Water speed can be slowed almost to the point where the pump will start to cavitate in order to accommodate slower swimming species.

Figure 7:
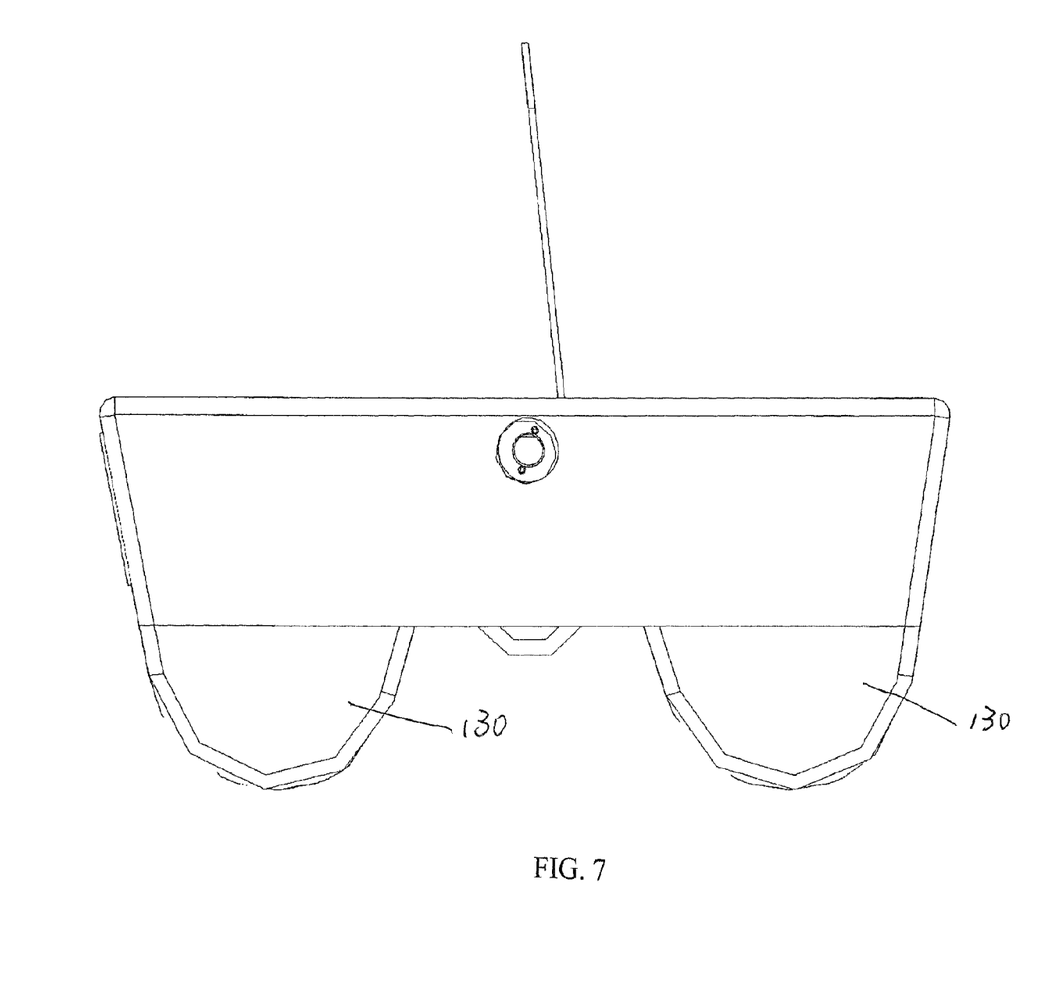
FIG. 7 is an end view of one side of an embodiment of the double tank configuration according to the present invention.
Figure 8:
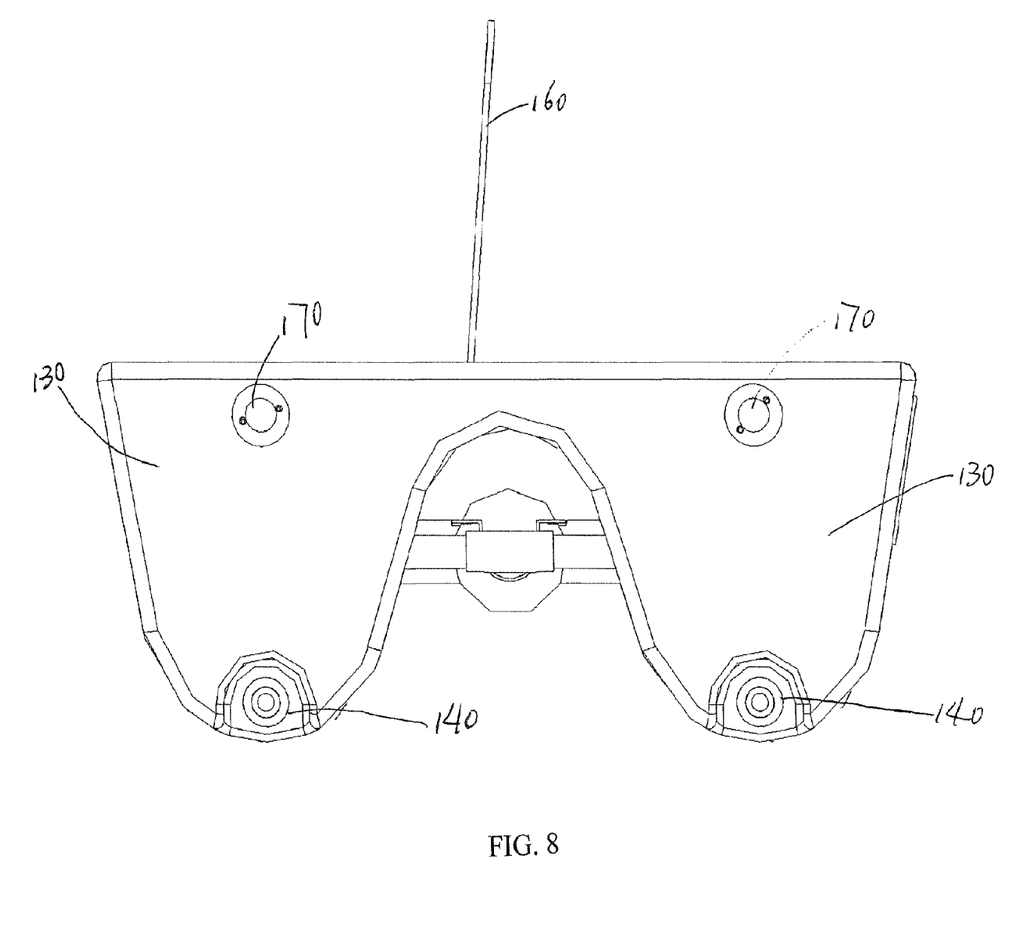
FIG. 8 is an end view of the other side of the embodiment of the double tank configuration as shown in FIG. 7.

FIGS. 7-8 are side views showing each side of an embodiment of the double tank configuration. Similar to the single tank configuration, the bottom of the tanks 130 of the double tank configuration can also have a semi-circular shape to reduce the size and weight of the tank. As shown in FIG. 8, a drain 140 may be provided at the bottom of the tanks 130 for discharging the water in the tank.

Figure 9:
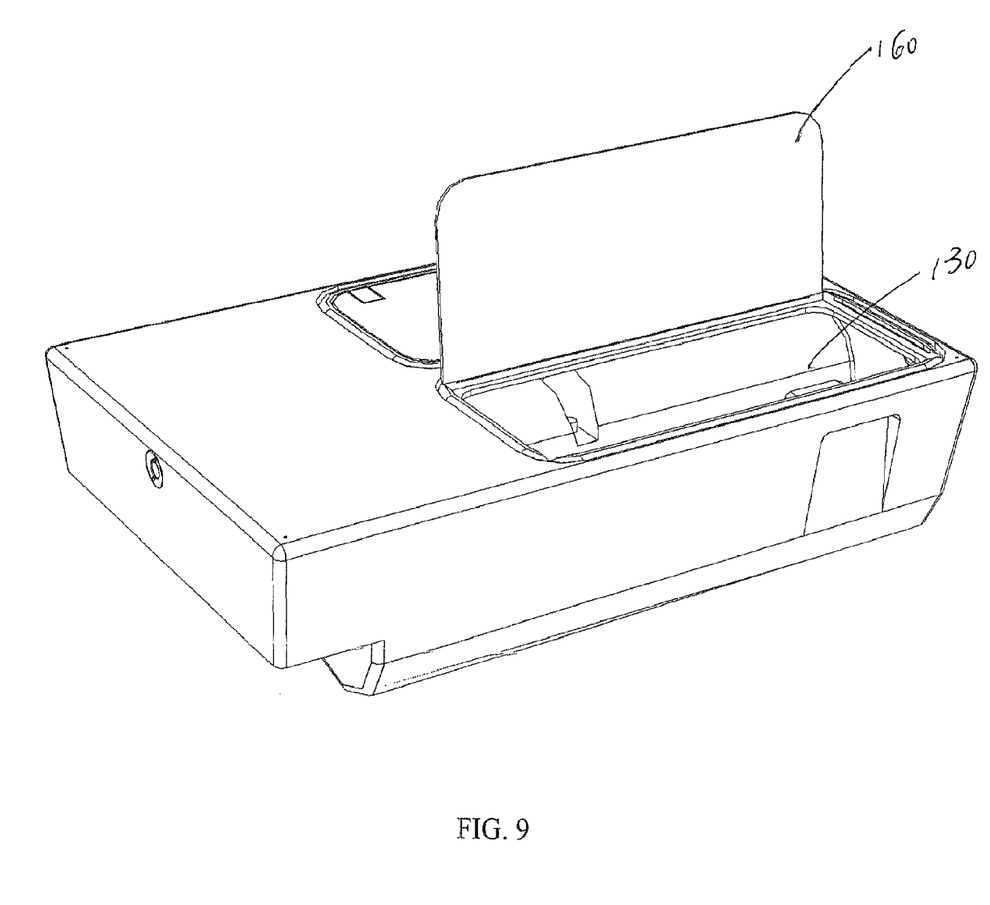
FIG. 9 is a top perspective view showing the side of the double tank configuration as shown in FIG. 7.
Figure 10:
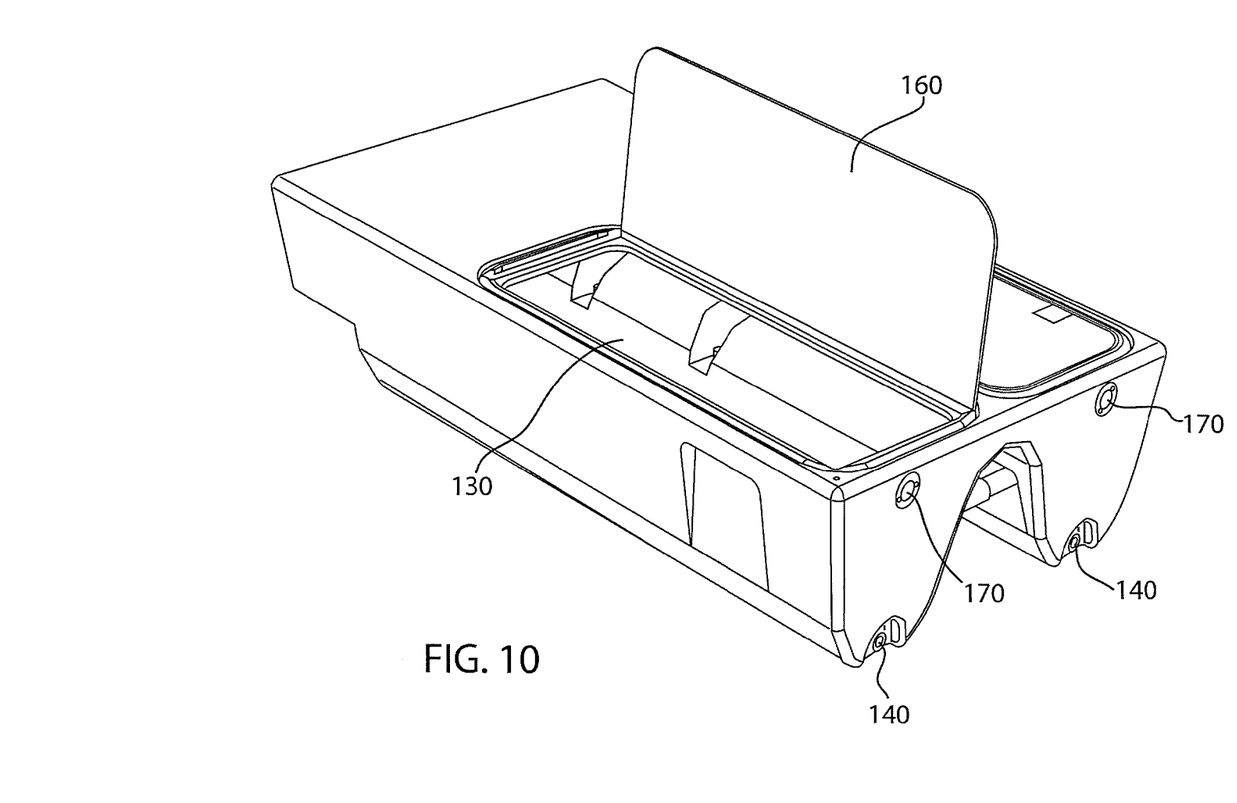
FIG. 10 is a top perspective view showing the side of the double tank configuration as shown in FIG. 8.

FIGS. 9-10 are top perspective views showing the two sides of the double tank configuration as shown in FIGS. 7-8. As can be seen in FIGS. 9-10, a lid 160 is provided for each tank 130.

Figure 11:
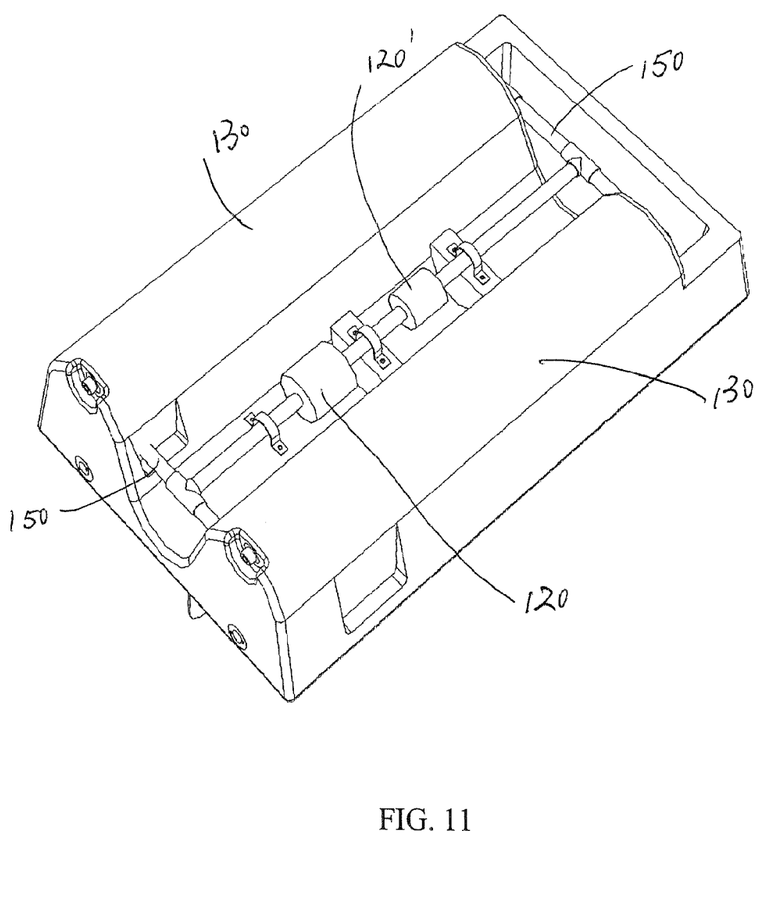
FIG. 11 is a bottom perspective view of the double tank configuration.

FIG. 11 is a bottom perspective view of the double tank configuration as shown in FIGS. 7-10, showing the connecting pipes 150 and pumps 120, 120'.

Each of the pumps has a suction side and a discharge side. In a single pump configuration, the suction side will have lower pressure than the discharge side. In a dual pump configuration, by adjusting the speed and pressures at each pump, it is possible to have a high flow rate between the pumps yet have little pressure differential between upstream discharge and downstream suction. That is, if the downstream pump is operating at an RPM to draw in water faster than supplied by the conduit 134 between the pipes (i.e., faster than output by the upstream pump), the water, being incompressible, will either cause a negative pressure, causing the upstream pump to rotate faster, or, if an air line is connected to the conduit between the pumps, will draw in air. If the output of the upstream pump and draw of the downstream pump are approximately equal, and there is a high flow of water through the connecting conduit, then the venture effect can be used to draw air into the connecting conduit 134 even when there is no negative pressure in the pipe. In the case that the output of the upstream pump is higher than the setting for the downstream pump, then there will be pressure in the conduit between the pumps, and in this case it is preferred to introduce air from a compressed air or oxygen tank, or to introduce air at another point. Preferred methods for introduction of air or oxygen are disclosed in U.S. Pat. Nos. 5,582,777; 5,632,220; 5,988,600; 6,038,993; 6,394,423 and 6,655,663 assigned to the assignee of the present invention.

All variations of the endless stream tanks, including portable single tanks, portable double tanks, and permanently installed boat livewells can utilize a raw water entry at the inlet of the tank with an overboard discharge 170 (see FIGS. 8 and 10) at the outlet to provide a uni-directional flow within the tank, and thereby maintaining the endless stream concept. This can be utilized as a back-up system in the event of aeration pump failure, or to provide changing of the tank water.

Figure 12:
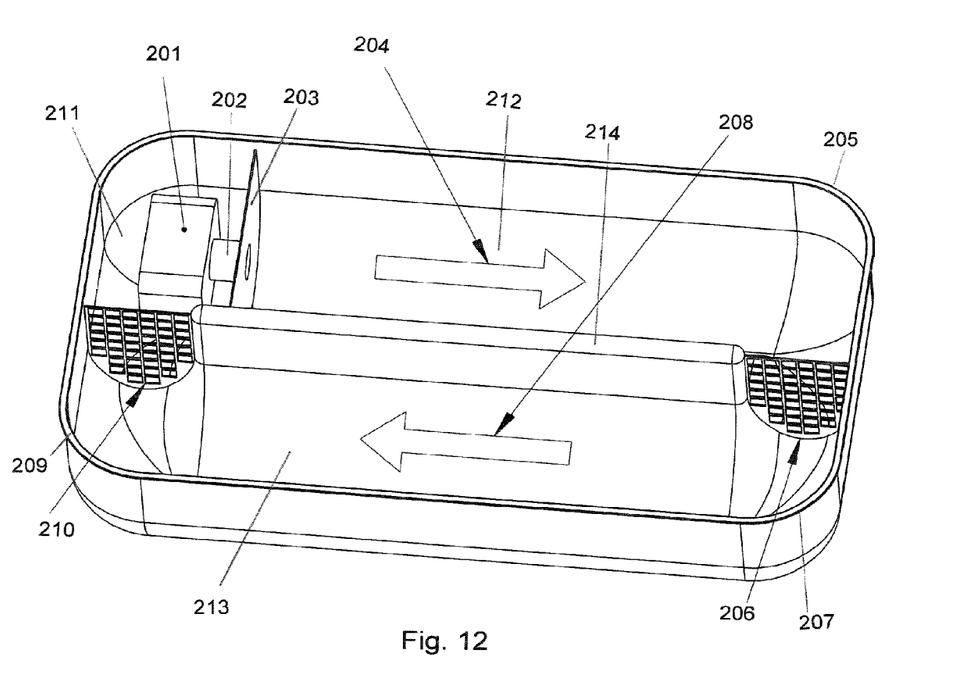
FIG. 12 is a side elevated view of an embodiment wherein a second flow tank is used in place of return-flow piping.

In a further embodiment of the invention, the advantages of the single tank and double tank can be combined by configuring the return flow as a second tank. As shown in FIG. 12, a second flow tank (as used in the dual tank embodiment) is used in place of return-flow space or piping. The flow resistance through the space between outer tank and inner container, and/or the flow resistance through the connecting conduits, is eliminated, thus increasing the efficiency of the system and allowing use of a lower capacity pump, increasing battery life. Since the need for a second wall and/or return flow conduits is eliminated, there is a savings in both material and space.

More specifically, a pump 201 is provided, preferably at one corner of the elongate endless flow tank. A means for introducing air is preferably provided such that the air is finely masticated in the pump and leaves outlet 202 as a fine fog with tiny air bubbles. This improves aeration of the water and survivability of the fish in the compartments. Aerated water is pumped or jetted out the outlet or nozzle 202 through divider plate 203. The divider plate ensures that no water loops back from pump outlet 202 to the area of pump inlet 211. In place of a single outlet, a diffuser wall with many outlets may be provided. Some species of fish prefer to swim towards a single stronger jet, others prefer an even flow across the entire chamber. Water flows in compartment 212 along arrow 4 until reaching curved corner 205, whereupon water is redirected towards separating mesh 206. The mesh is simply provided to prevent fish from swimming between compartments 212, 213, and provides no barrier to the free flow of water.

After passing through mesh 206 water is redirected at curved corner 207 and flows through the length of compartment 213 along arrow 208. Upon reaching curved corner 209, water is deflected towards mesh 210 and is drawn into intake space 211. The water thus flows in a continuous loop, first in one direction along one elongate container, then in a return direction along a second elongate container. Separator wall 214 separates the flow of water and also separates the fish. Thus, the separator wall is preferably opaque. In this double flow tank, the method for introduction of air is preferably as disclosed in one or more of U.S. Pat. Nos. 5,582,777; 5,632, 220; 5,988,600; 6,038,993; 6,394,423 and 6,655,663 assigned to the assignee of the present invention.

Figure 13:
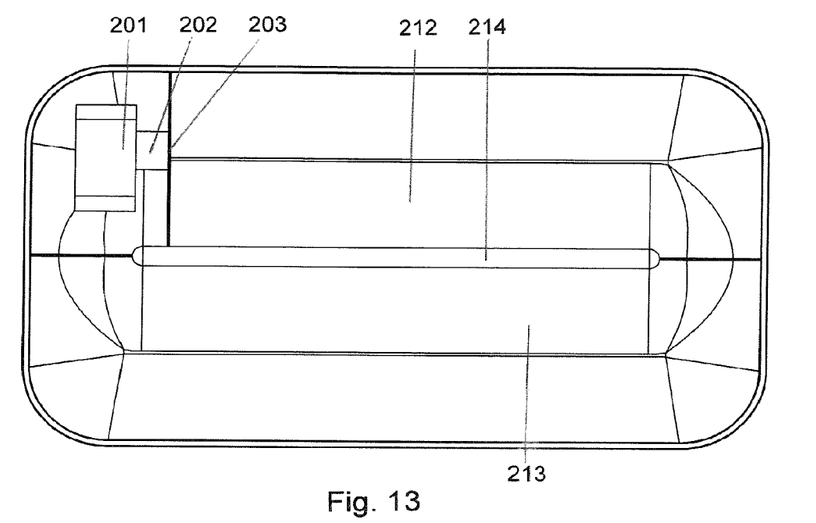
FIG. 13 is a top plan view onto the embodiment of FIG. 12.
Figure 14:
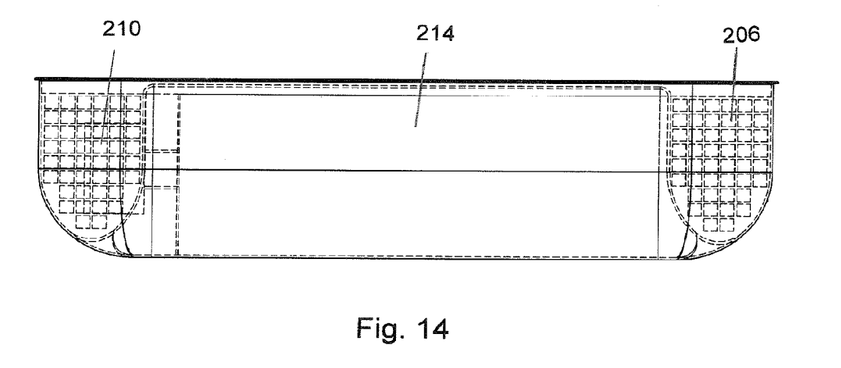
FIG. 14 is a side view of the embodiment of FIG. 12, with interior structures shown in dash line.
Figure 15:
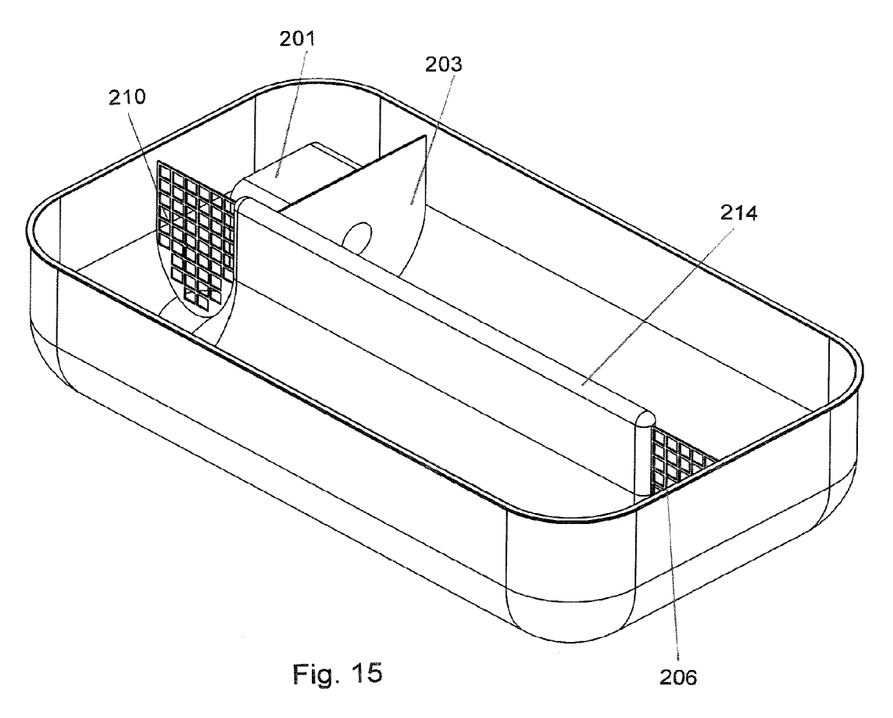
FIG. 15 is an elevated oblique view of the embodiment of FIG. 12.

FIG. 13 is a top plan view onto the embodiment of FIG. 12, FIG. 14 is a side view of the embodiment of FIG. 12, with interior structures shown in dash line, and FIG. 15 is an elevated oblique view of the embodiment of FIG. 12.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Now that the invention has been described, I claim:

1. A method for keeping fish in a live and healthy condition, the method comprising:
   introducing the fish into an endless flow fish tank or live well (100), comprising: a longitudinally elongate outer container (40); a longitudinally elongate inner container (30) having a bottom formed as a semi-circular channel shape and having a depth that is less than said longitudinally elongate outer container, positioned within the outer container (40), wherein the space inside the inner container defines a fish chamber, wherein the space between the inner container and outer container, defined by the difference in depths of said inner and outer containers, forms a flow return chamber, said fish chamber having an upstream end (31) with at least one flow inlet (32) and a downstream end (33) with at least one flow outlet (34), wherein said upstream end and said downstream end are on longitudinally opposite ends of said inner container; and a pump (20) located inside the outer container (40) but outside the inner container (30) with a pump outlet fluidly connected to the fish chamber inlet (32) and a pump inlet fluidly connected to the fish chamber outlet, and
   circulating the water through the fish chamber and flow return chamber.

2. The method according to claim 1, wherein side walls and a bottom of the inner container extend between the upstream and downstream ends of said inner container, and wherein said side walls and bottom are water-tight.

3. The method according to claim 1, further comprising a tank lid (10) for closing the fish tank or live well during noimal operating condition.

4. The method according to claim 3, wherein the tank lid (10) is pivotably connected to one side of the outer container.

5. The method according to claim 1, wherein said outer container is provided with an access opening adapted for servicing said pump, and wherein said access opening is provided with a threaded pump lid (22) for closing the access opening.

6. The method according to claim 1, wherein the outer container (40) has at least one corrugated wall (42).

7. The method according to claim 1, further comprising determining the natural swimming speed of the fish contained within the inner container, and adjusting the speed of the water pump to accommodate the natural swimming speeds of the type of fish.

8. The method according to claim 1, further comprising supplying air or oxygen to the fish.

9. The method according to claim 2, wherein the volume of the space between the inner and outer containers (30, 40) is less than the volume of the inner container.

10. The method according to claim 1, further comprising means for aeration, said means comprising a means for metering air or oxygen introduced via venturi or pressure.

11. The method according to claim 1, wherein the pump is an upstream pump (120), and further comprising a downstream pump (120'), and wherein aeration occurs by metering gasses between said upstream and downstream pumps.

12. The method according to claim 11, wherein the downstream pump (120') can be bypassed.

13. A method for keeping fish in a live and healthy condition, the method comprising:

introducing the fish into an endless flow fish tank or live well comprising a longitudinally elongate outer container (40); a longitudinally elongate inner container (30) positioned within the outer container (40), wherein the space inside the inner container defines a fish chamber, the fish chamber having an upstream end (31) with at least one flow inlet (32) and a downstream end (33) with at least one flow outlet (34) and a bottom fowled as a semi-circular channel shape; and a pump (20) with an outlet fluidly connected via piping to the fish chamber inlet (32) and fluidly connected via piping to the fish chamber outlet; and means for aeration of the water, and circulating the aerated water in the elongate chamber.

\* \* \* \* \*